United States Patent
Nakamura et al.

(10) Patent No.: US 7,220,089 B2
(45) Date of Patent: May 22, 2007

(54) TOOL MOUNTING DEVICE FOR TURNING CENTER

(75) Inventors: Takio Nakamura, Nagaoka (JP); Akihiro Goto, Nagaoka (JP); Tatsuo Shimizu, Nagaoka (JP); Takashi Ueda, Nagaoka (JP)

(73) Assignee: O-M Ltd., Osaka (JP)

( * ) Notice: Subject to any disclaimer, the term of this patent is extended or adjusted under 35 U.S.C. 154(b) by 0 days.

(21) Appl. No.: 11/337,649

(22) Filed: Jan. 24, 2006

(65) Prior Publication Data

US 2006/0188353 A1   Aug. 24, 2006

(30) Foreign Application Priority Data

Feb. 22, 2005   (JP)   .............................. 2005-045951

(51) Int. Cl.
*B23C 5/26* (2006.01)
*B23B 31/00* (2006.01)

(52) U.S. Cl. .................. 409/233; 408/239 R; 408/240; 409/232

(58) Field of Classification Search ................ 409/233, 409/232, 135, 136; 408/239 R, 240; 236/130, 236/119, 64.11
See application file for complete search history.

(56) References Cited

U.S. PATENT DOCUMENTS

| | | | | |
|---|---|---|---|---|
| 4,303,360 A | * | 12/1981 | Cayen et al. ................ | 409/233 |
| 4,352,612 A | * | 10/1982 | Benatti ........................ | 409/233 |
| 4,628,586 A | * | 12/1986 | Yoshimi et al. ............. | 409/233 |
| 4,915,553 A | * | 4/1990 | Lazarevic ................... | 409/233 |
| 5,026,223 A | * | 6/1991 | Hunt .......................... | 409/233 |
| 5,039,261 A | * | 8/1991 | Takada ........................ | 409/136 |
| 5,052,866 A | * | 10/1991 | Bauch et al. ............... | 409/233 |
| 5,145,298 A | * | 9/1992 | Marantette .................. | 409/135 |
| 5,193,954 A | * | 3/1993 | Hunt .......................... | 409/233 |
| 5,391,027 A | * | 2/1995 | Green ......................... | 409/233 |
| 5,421,681 A | * | 6/1995 | Stephens .................... | 408/168 |
| 5,722,806 A | * | 3/1998 | Erickson et al. ............ | 409/233 |

(Continued)

FOREIGN PATENT DOCUMENTS

JP   2004-050324 A   2/2004

(Continued)

*Primary Examiner*—Dana Ross
(74) *Attorney, Agent, or Firm*—Sughrue Mion, PLLC

(57) ABSTRACT

To provide a tool mounting device for a turning center that allows a rotating tool to be clamped/fixed using a shared clamp mechanism (8), and a turning tool (1B) to be clamped/fixed in an engaged/locked state in a turning center. In the turning center configured with the shared clamp mechanism (8), a cylinder device (9) acting as a drawbar drive device (9) of the clamp mechanism (8) has a first clamp position (b) and second clamp position (c) in relation to a release position (a); a rotation allowance gap (14) is maintained between the stopper (12) and the support unit (13) in the first clamp position (b) to specifically clamp/fix the rotating tool (1A); the reciprocating driver (11) is driven by an amount equal to the rotation allowance gap (14) in the second clamp position (c); and when the support unit (13) and the stopper (12) are brought into contact and a load is imposed, the stopper (12) is supported/stopped by the support unit (13), and the reciprocating driver (11) is engaged/locked by the wedge mechanism (18) in the position of the return blocking state in which the return of the drawbar (7) is blocked.

9 Claims, 13 Drawing Sheets

U.S. PATENT DOCUMENTS 6,602,031 B2 * 8/2003 Hara .......................... 409/131
6,663,088 B2 * 12/2003 Kimura ................... 267/64.11
6,722,827 B1 * 4/2004 Anderson .................. 409/233
6,832,433 B2 * 12/2004 Kramer ....................... 29/558
6,896,455 B2 * 5/2005 Anderson .................. 409/233
6,979,156 B2 * 12/2005 Olsson et al. .............. 409/233
7,008,153 B2 * 3/2006 Rehn et al. ................. 409/233
2005/0002745 A1 * 1/2005 Olsson et al. .............. 408/141

FOREIGN PATENT DOCUMENTS

JP            2004-202659 A        7/2004
JP            2004-216536 A        8/2004

* cited by examiner

TOOL MOUNTING DEVICE FOR TURNING CENTER

BACKGROUND OF THE INVENTION

1. Field of the Invention

The present invention relates to a tool mounting device for a turning center that can suitably exchange rotating tools and turning tools to perform milling and cutting (turning).

2. Background Art

In a turning center, a mounting engagement unit for engaging a tapered shank provided to the base end of a tool is disposed on a main shaft that is rotatably mounted on a ram via a bearing unit. A clamp mechanism is disposed for clamping a clamping convexity of the tapered shank by retracting the drawbar, and drawing/engaging the tapered shank to the mounting engagement unit to detachably/replaceably mount and fix a tool to the main shaft, so as to allow the shaft to be clamped and released based on the reciprocating control of the drawbar. Tools are suitably attached and detached using the shared clamping mechanism, and rotating tools are rotatably clamped/fixed together with the main shaft. When turning tools are clamped/fixed, the tools are baffled and fixed together with the main shaft; and rotating tools and turning tools can thereby be suitably exchanged and mounted, and both milling and cutting can be carried out.

In such a turning center, when the clamp mechanism of the rotating tools and turning tools is configured so as to be shared as described above, the radial load on the turning tools is considerably greater than on the turning tools, and the clamp force must therefore be increased. In order to do so, however, a hydraulic cylinder device with a large diameter for outputting a considerable drive force must be used, and there are configurations in which a hydraulic two-stage cylinder is used.

Since a hydraulic cylinder device is therefore necessarily required, an oilless structure cannot be obtained and energy and resources cannot be saved.

On the other hand, for example, a wedge mechanism (Japanese Laid-open Patent Application No. 2004-202659) developed by the applicant, and other mechanisms capable of withstanding a considerable cutting force even if an air cylinder device is used are difficult to mount in a turning center because of the need to rotatably clamp and fix a rotating tool in the turning center and because a shared clamp mechanism is provided for clamping/fixing rotating tools and turning tools.

[Prior Art 1] Japanese Laid-Open Patent Application No. 2004-216536

[Prior Art 2] Japanese Laid-Open Patent Application No. 2004-202659

[Prior Art 3] Japanese Laid-Open Patent Application No. 2004-50324

SUMMARY OF THE INVENITON

An object of the present invention is to provide an energy-saving, resource-saving innovative tool mounting device for a turning center that provides a breakthrough from conventional ideas, whereby a tool mounting device can be implemented with a hydraulic cylinder or an air cylinder device with low driving force, and a shared clamp mechanism can be used that allows rotating tools and turning tools to be suitably exchanged, clamped, and fixed even when an air cylinder is used as the drive source. The device can appropriately withstand a considerable cutting force even when the drive source is an air cylinder incapable of producing a drive force that can directly counter a considerable cutting force directly applied when, for example, a turning tool is clamped. Rotating tools can thereby also be rotatably mounted without interfering with the turning function, and an oilless configuration can also be easily achieved as needed.

The main points of the present invention are described below with reference to the diagrams.

In the tool mounting device for a turning center according to a first aspect, rotating tools 1A and turning tools 1B are exchanged and used, wherein a mounting engagement unit 6 for engaging a tapered shank 5 provided to the base end of a tool 1 is disposed on a main shaft 4 that is rotatably mounted on a ram 3 via a bearing unit 2; a clamp mechanism 8 is disposed for clamping a clamping convexity 5A of the tapered shank 5 by the retracting of a drawbar 7 and drawing in and engaging the tapered shank 5 to the mounting engagement unit 6 to mount/fix tools 1 to the main shaft 4 so as to allow clamp actuation/release on the basis of the reciprocating control of the drawbar 7; and the clamp mechanism 8 is configured to actuate the clamping by retracting the drawbar 7 with a retracting force produced by an elastic member 10, and to return the drawbar 7 and release the clamping by pushing/driving against the retracting force of a drawbar driving device 9, comprising: the drawbar 7 that rotates together with the main shaft 4 being rotatably mounted on a reciprocating driver 11 which is driven by the drawbar driving device 9 to push/drive the drawbar 7; a stopper 12 being provided to the drawbar 7 or to a location that moves together with the drawbar 7; a support unit 13 for supporting the stopper 12 and blocking the drawbar 7 from returning from the retracted clamp position of the drawbar 7 being provided to the reciprocating driver 11 or to a location that moves together with the reciprocating driver 11; the stopper 12 being configured so as to make no contact with the support unit 13 and to maintain a rotation allowance gap 14 therebetween when at least the drawbar 7 is retracted by the retracting force of the elastic member 10 and the rotating tool 1A is clamped/fixed, and so as to be brought to a return blocking state in which the reciprocating driver 11 is retracted by the drawbar driving device 9 by an amount equal to at least the rotation allowance gap 14 and the stopper 12 can be supported by the support unit 13 when a turning tool 1B is clamped/fixed; a wedge mechanism 18 being provided in which a reciprocatingly movably disposed wedge 15 is moved/driven by a wedge driving device 16 to engage a wedge engagement unit 17 and to engage and lock the retracted clamp position of the drawbar 7 in a state in which the reciprocating driver 11 is retracted and brought to a return blocking state; and a cylinder device 9 being provided as the drawbar driving device 9 has a release position a for pushing/driving the drawbar 7 against the retracting force of the elastic member 10 and releasing the clamp on the rotating tool 1A or the turning tool 1B, a first clamp position b for clamping/fixing the rotating tool 1A by the retracting force of the elastic member 10, and a second clamp position c for moving the stopper 12 into the return blocking state that allows the support unit 13 to be supported and clamping/fixing the turning tool 1B in a state in which the position is engaged/locked by the wedge mechanism 18.

In the tool mounting device for a turning center according to a second aspect, the clamping mechanism 8 and the wedge mechanism 18 are configured so that the support unit 13 is disposed facing the retracting direction side of the drawbar 7 of the stopper 12 that moves together with the reciprocating movement of the drawbar 7, so as to move together with the reciprocating movement of the reciprocating driver 11; the stopper 12 makes no contact with the support unit 13 and the rotation allowance gap 14 is maintained in the first clamp position b for clamping/fixing the rotating tool 1A; and the reciprocating driver 11 moves by an mount equal to the rotation allowance gap 14, the support unit 13 makes contact with the stopper 12, the stopper 12 is set in the return blocking state that allows the stopper to be supported by the support unit 13, the wedge 15 is moved by the wedge driving device 16 to engage the wedge engagement unit 17 disposed on the reciprocating driver 11, and the retracted position of the reciprocating driver 11 in the return stop state is engaged in the second clamp position c for clamping/fixing the turning tool 1B.

In the tool mounting device for a turning center according to a third aspect, a drawbar driver 7A with which the reciprocating driver 11 makes contact when the reciprocating driver 11 returns the drawbar 7 by pushing is provided to the drawbar 7, and the drawbar driver 7A is pushed by the pushing/driving of the reciprocating driver 11 using the drawbar driving device 9 to return the drawbar against the action of the elastic member 10 and release the clamp; and when the rotating tool 1A is clamped/fixed, the reciprocating driver 11 is pushed back by the drawbar driver 7A under the urging of the retracting force of the elastic member 10 while the drawbar 7 is retracted, and the drawbar 7 and drawbar driver 7A are retracted to the clamp fixing position, after which the reciprocating driver 11 is retracted further and the cylinder device 9 serving as the drawbar driving device 9 is set to the first clamp position b, and a rotation allowance gap 22 is thereby maintained between the drawbar driver 7A and the reciprocating driver 11 as well.

In the tool mounting device for a turning center according to a fourth aspect, a force point 25 is provided to an end portion of a rotating lever 24 that rotates about a fulcrum 23 pivotably fixed in a prescribed position; a reciprocating rod 9A of the cylinder device 9 as a lever drive device is linked to the force point 25; an actuator 26 is provided the other end of the lever 24 in a position in which the distance from the fulcrum 23 is less than the distance between the force point 25 and the fulcrum 23, and the reciprocating driver 11 is reciprocated at the actuator 26; and a lever mechanism 20 is provided capable of reciprocating and controlling the reciprocating driver 11 by increasing the reciprocating driving of the reciprocating rod 9A of the cylinder device 9.

In the tool mounting device for a turning center according to a fifth aspect, when the rotating tool 1A is clamped/fixed, a cylinder device 9 provided as the drawbar driving device 9 is temporarily brought to the second clamp position c, and is thereafter driven or released and set to the first clamp position b in which the rotation allowance gap 14 is maintained between the stopper 12 and the support unit 13 by the return force of the return elastic member 21 of the cylinder device 9; and the supply/discharge of the driving medium of the cylinder 9 is cut off at the first clamp position b to allow the first clamp position b to be maintained.

In the tool mounting device for a turning center according to a sixth aspect, the cylinder device 9 provided as the drawbar driving device 9 is other than a hydraulic cylinder device and is an air cylinder device.

In the tool mounting device for a turning center according to a seventh aspect, when the rotating tool 1A is clamped/fixed, the cylinder device 9 is temporarily brought to the second clamp position c, and is thereafter driven or released and set to the first clamp position b in which the rotation allowance gap 14 is maintained between the stopper 12 and the support unit 13 by the return force of the return elastic member 21 of the cylinder device 9; and the supply/discharge of the driving medium of the cylinder 9 is cut off at the first clamp position b to allow the first clamp position b to be maintained.

In the tool mounting device for a turning center according to an eighth aspect, the cylinder device 9 is other than a hydraulic cylinder device and is an air cylinder device.

In the tool mounting device for a turning center according a ninth aspect, the cylinder device 9 is other than a hydraulic cylinder device and is an air cylinder device.

The configuration of the present invention as described above provides an energy-saving, resource-saving innovative tool mounting device for a turning center, whereby a tool mounting device can be implemented in a turning center with a hydraulic cylinder or an air cylinder device with low driving force, and a shared clamp mechanism is used that allows rotating tools and turning tools to be suitably exchanged, clamped, and fixed even when an air cylinder is used as the drive source. The device can appropriately withstand a considerable cutting force even when the drive source is an air cylinder incapable of producing a drive force that can directly counter a considerable cutting force directly applied when, for example, a turning tool is clamped. Rotating tools can thereby also be rotatably mounted without interfering with the turning function, and an oilless configuration can also be easily achieved as needed.

In other words, even though the configuration has a shared clamp mechanism, an innovative tool mounting device for a turning center can be designed by simply changing the cylinder position of the drive device whereby the locking effect of the wedge mechanism is reliably demonstrated without interfering with the rotation of the rotating tool, a considerable load during the processes of a turning tool can be sufficiently countered even when a small drive source is used to enable an oilless structure in which, for example, an air cylinder device is used, and clamping/fixing can be securely performed.

In the second, third, and sixths aspects, an innovative tool mounting device for a turning center with excellent practical utility is provided in which even more remarkable operation and effects are demonstrated.

In the fourth aspect, since reciprocating driving is implemented using a lever mechanism, a strong retracting force can be generated even if, for example, an air cylinder device is used as the driving device, and an excellent tool mounting device for a turning center having greater clamping and fixing strength is provided.

In the fifth aspect, when the rotating tool is clamped/fixed, even if, for example, the movement resistance of the components and mechanisms varies through repeated use, a rotation allowance gap is constantly and reliably maintained, resulting in an exceptional tool mounting device for a turning center.

BEST MODE FOR EMBODYING THE INVENTION

Figure 1:
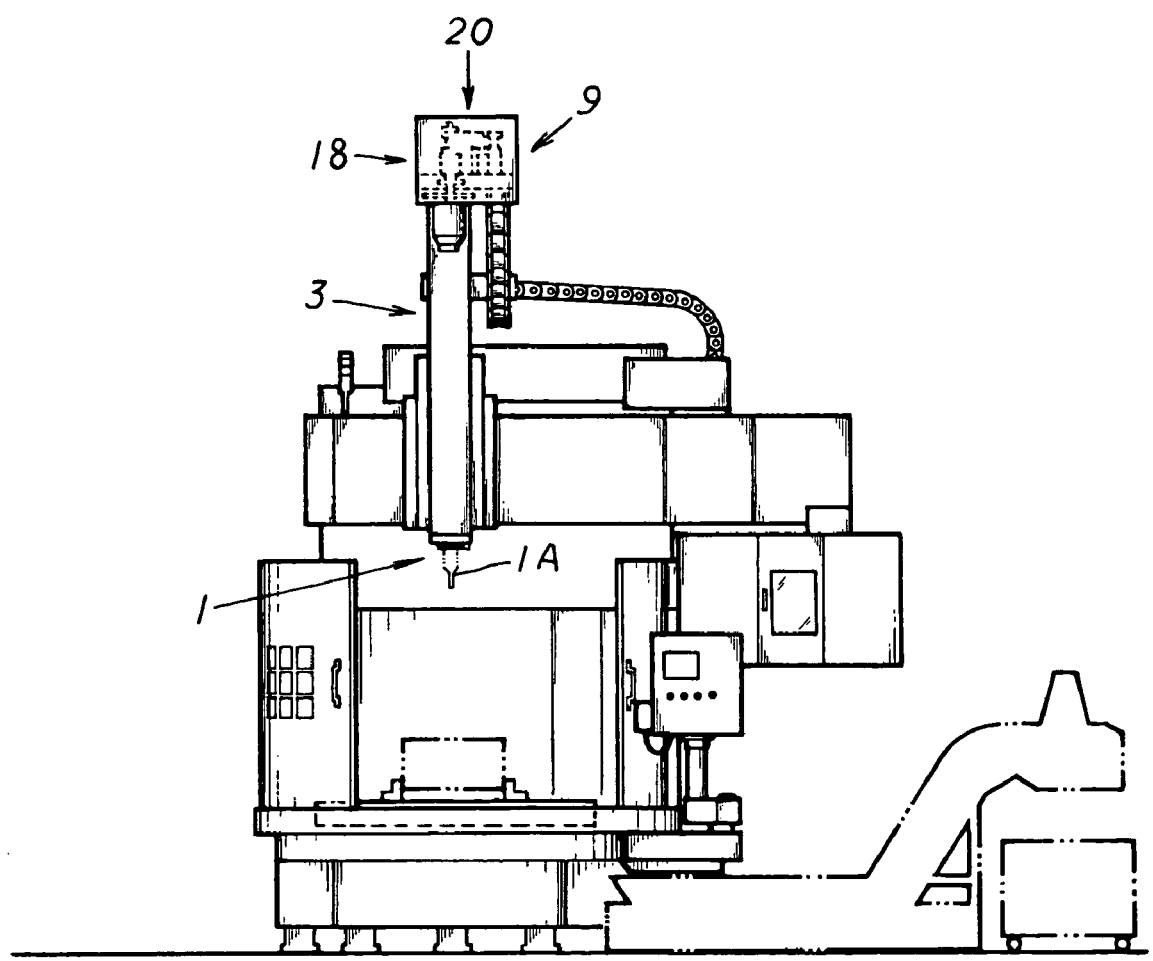
FIG. 1 is a schematic structural diagram of the turning center of the present example.
Figure 2:
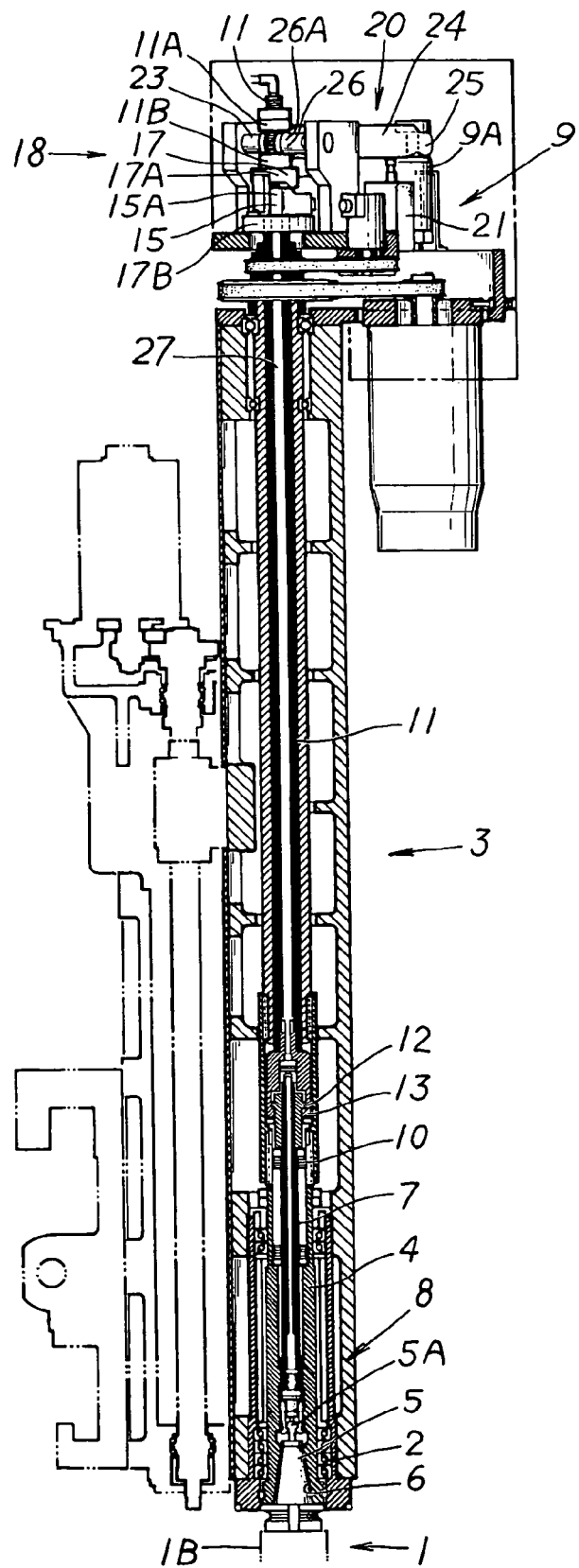
FIG. 2 is a schematic structural cross-sectional diagram of the turning center of the present example.
Figure 3:
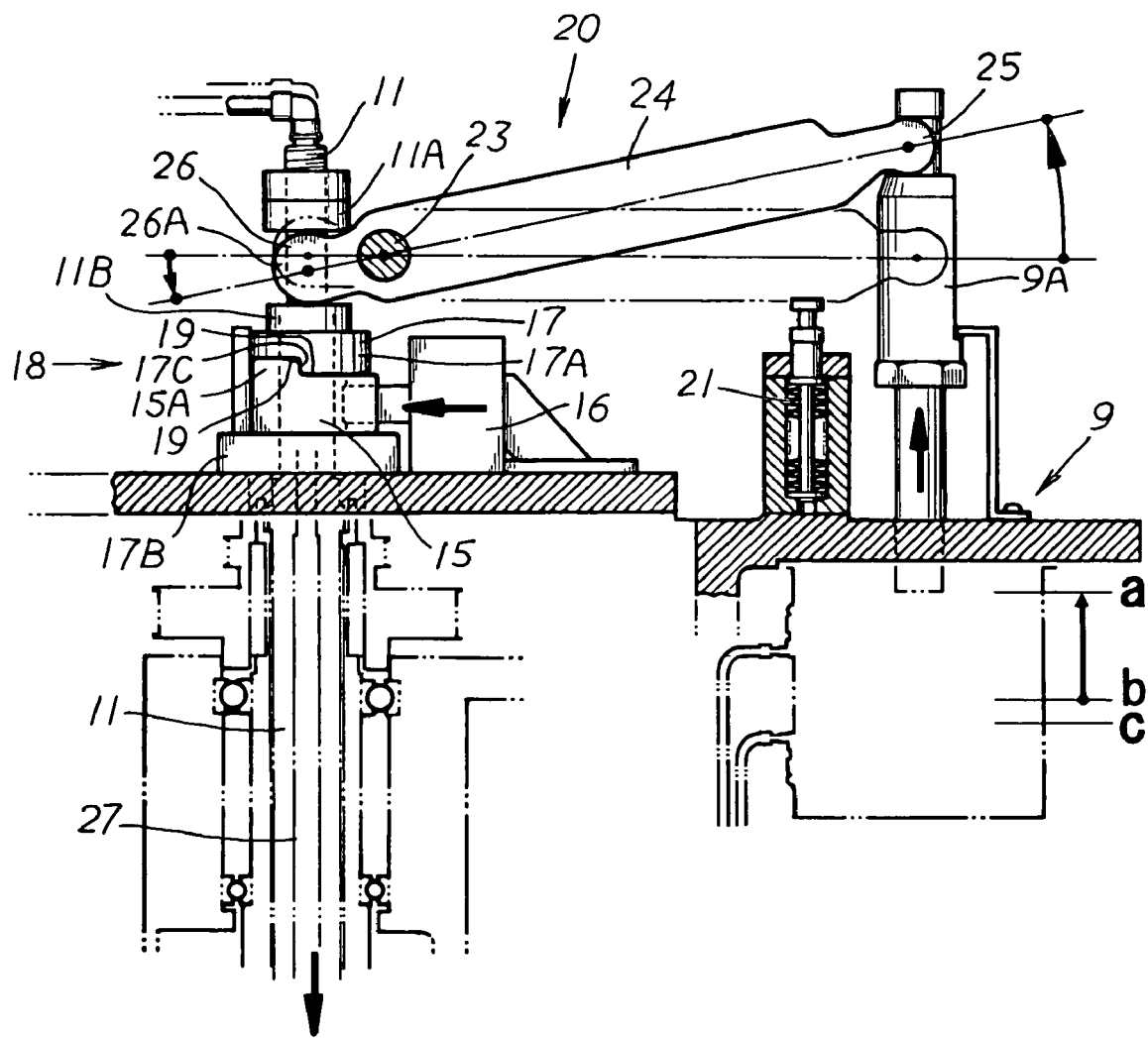
FIG. 3 is a partial descriptive diagram of the state in which the drawbar driving device of the turning center of the present example has been unclamped (release position).
Figure 4:
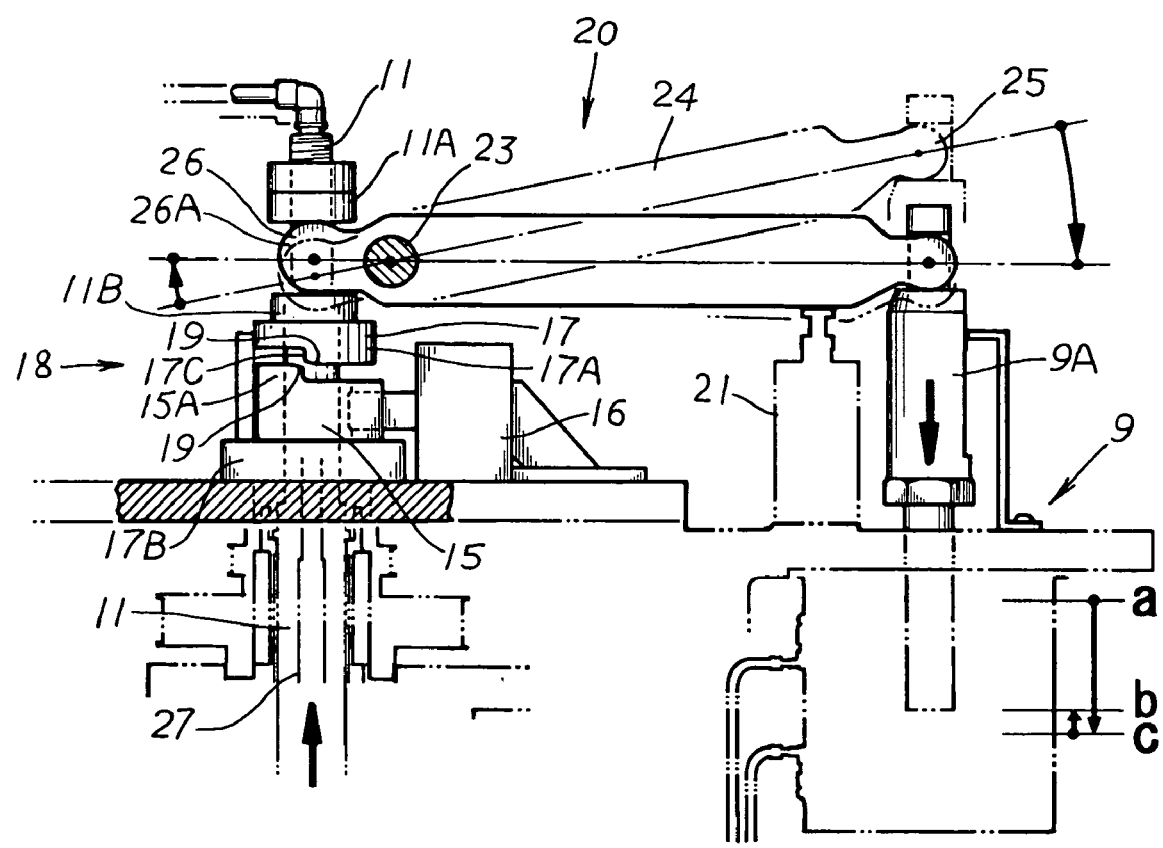
FIG. 4 is a partial descriptive diagram of the wedge mechanism in a release state in which the drawbar driving device of the turning center of the present example is actuated and clamped and the rotating tool is mounted (first clamp position).
Figure 5:
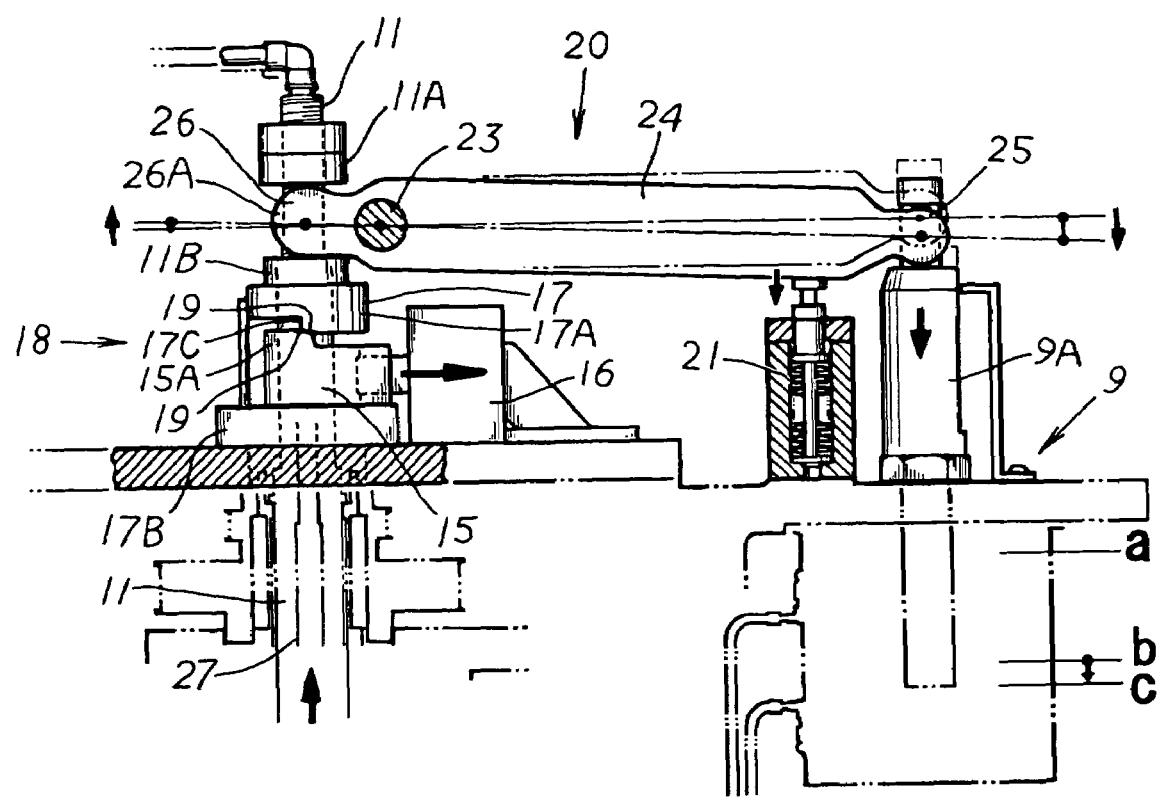
FIG. 5 is a partial descriptive diagram of the wedge mechanism in an operating state in which the drawbar driving device of the turning center of the present example is actuated and clamped and the turning tool is mounted (second clamp position).
Figure 6:
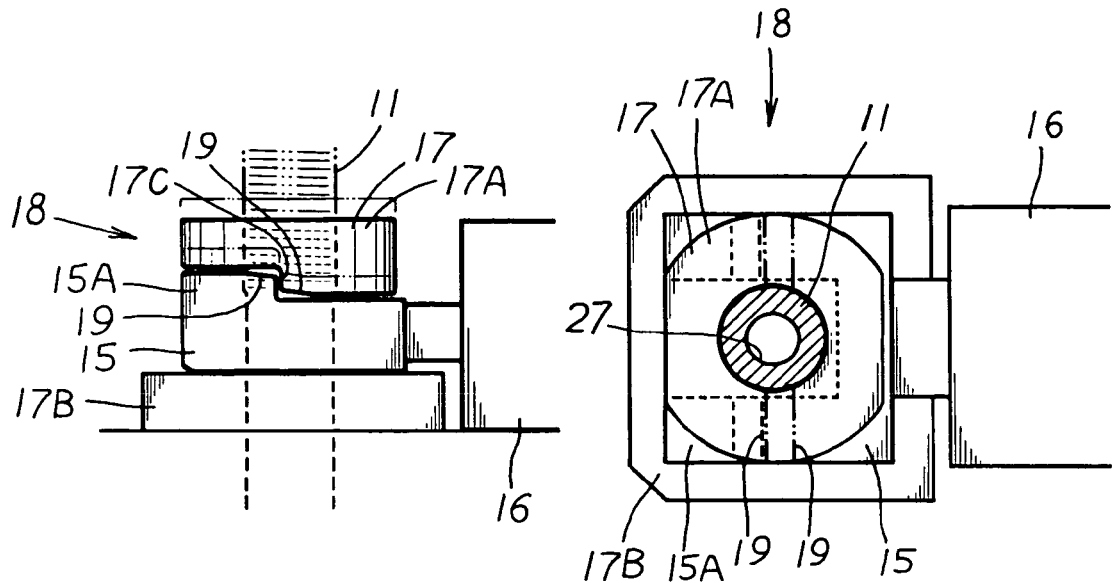
FIG. 6 is a descriptive diagram showing the release state of the wedge mechanism of the present example.
Figure 7:
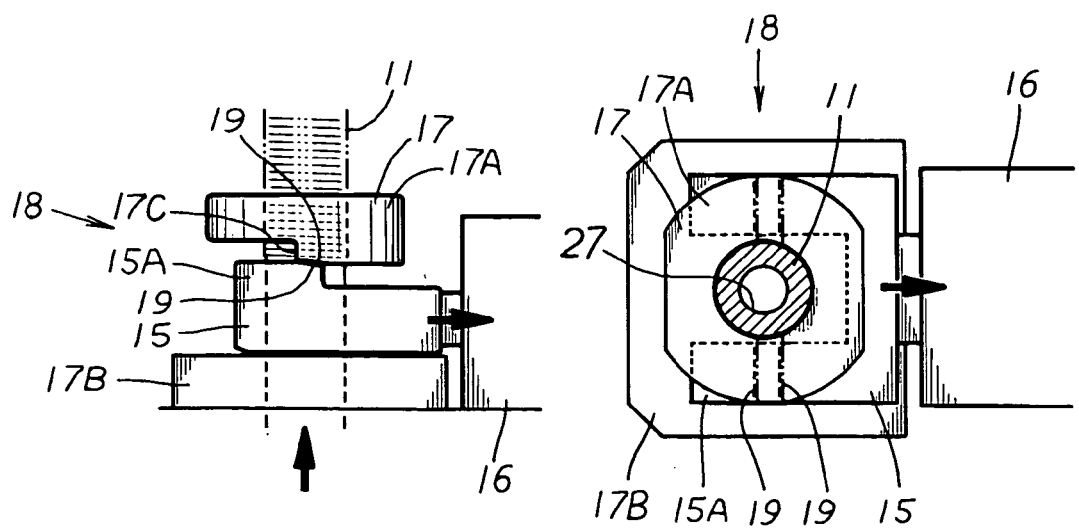
FIG. 7 is a descriptive diagram showing the operating state of the wedge mechanism of the present example.
Figure 8:
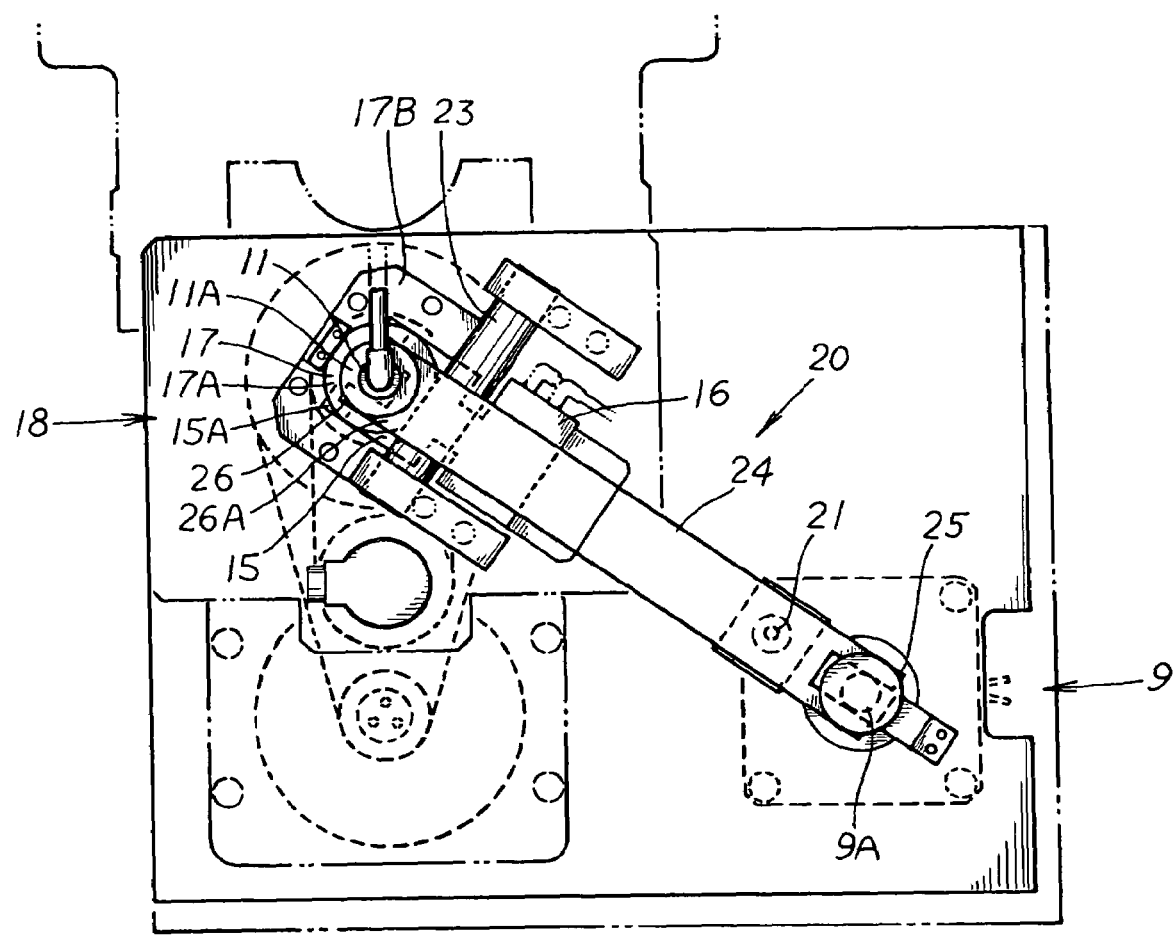
FIG. 8 is a descriptive plan view of the drawbar driving device of the turning center of the present example.
Figure 9:
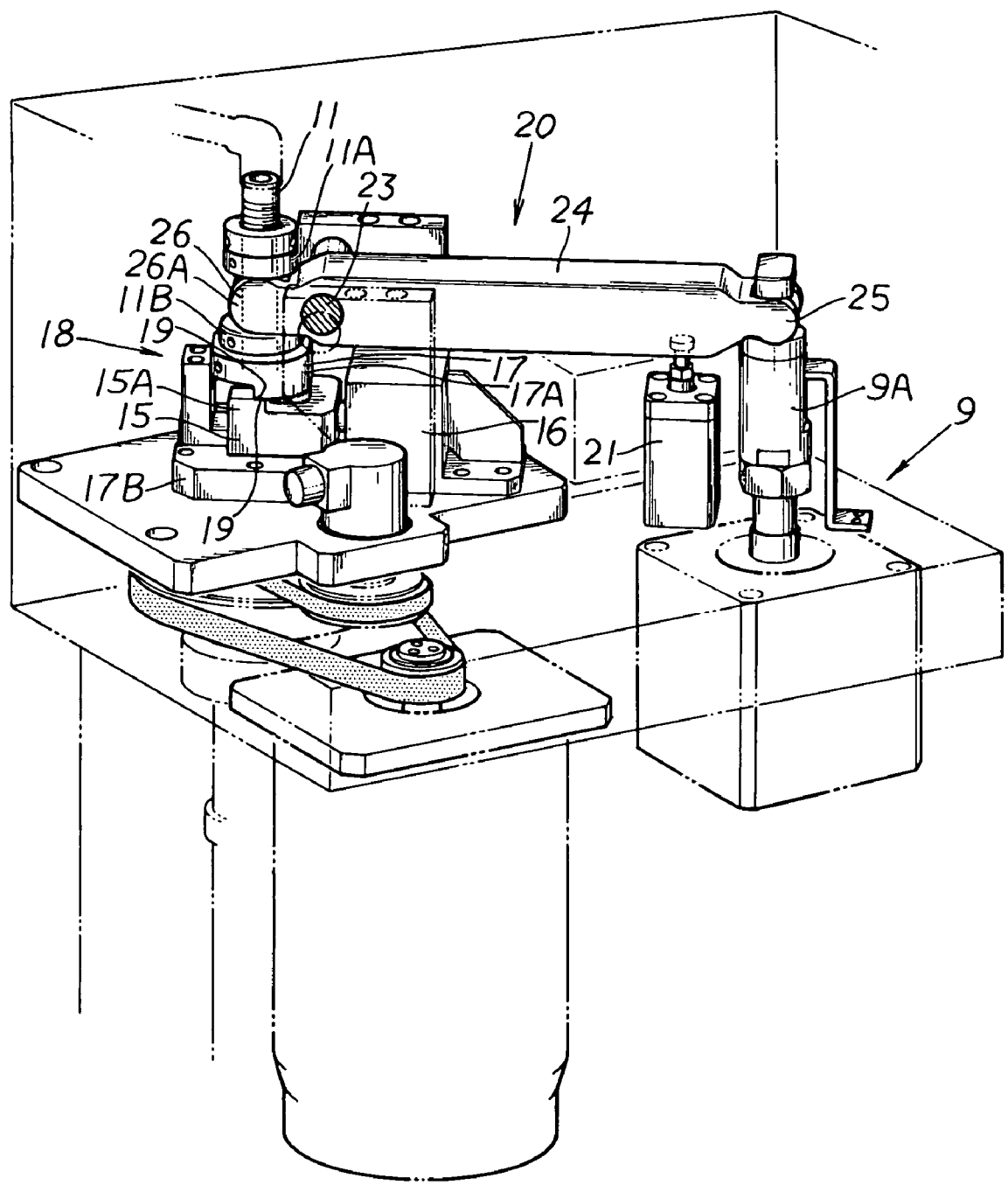
FIG. 9 is a descriptive perspective view of the second clamp position of the wedge mechanism, the lever mechanism, and the drawbar driving device of the turning center of the present example.
Figure 10A:
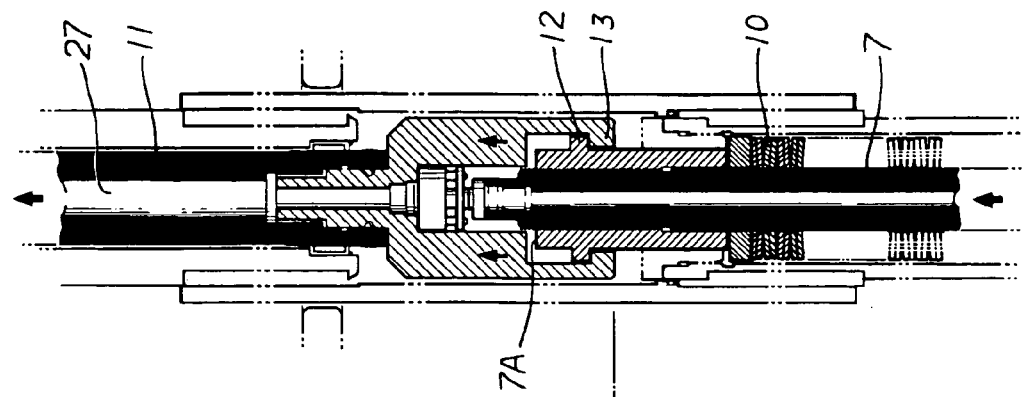
FIGS. 10A to 10C are descriptive cross-sectional diagrams of the clamp positions of the bearing unit provided to the reciprocating driver and the drawbar stopper of the turning center of the present example.
Figure 10B:
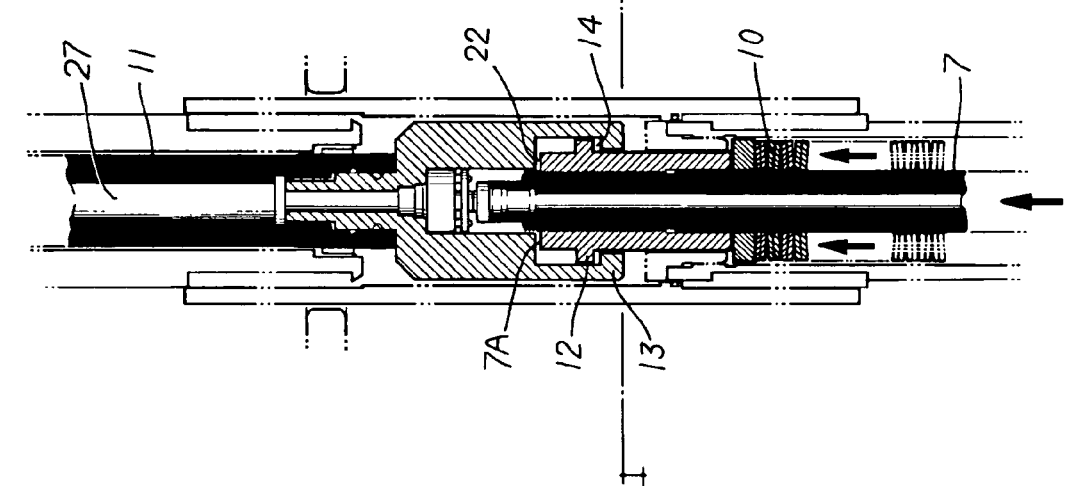
Figure 10C:
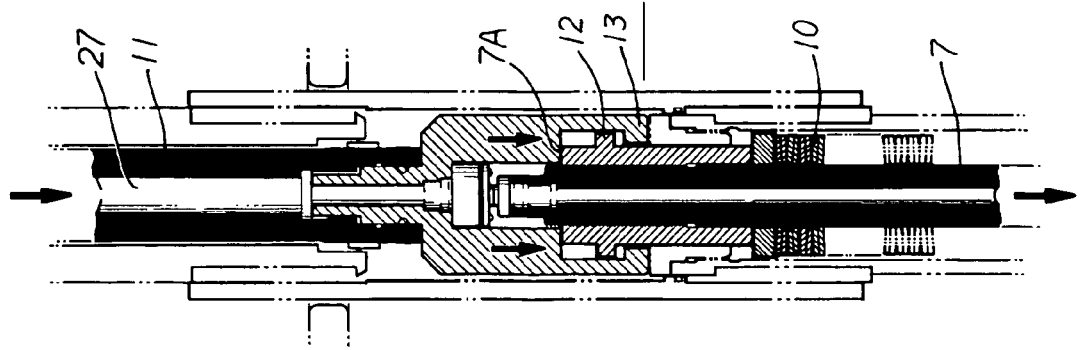
Figure 11:
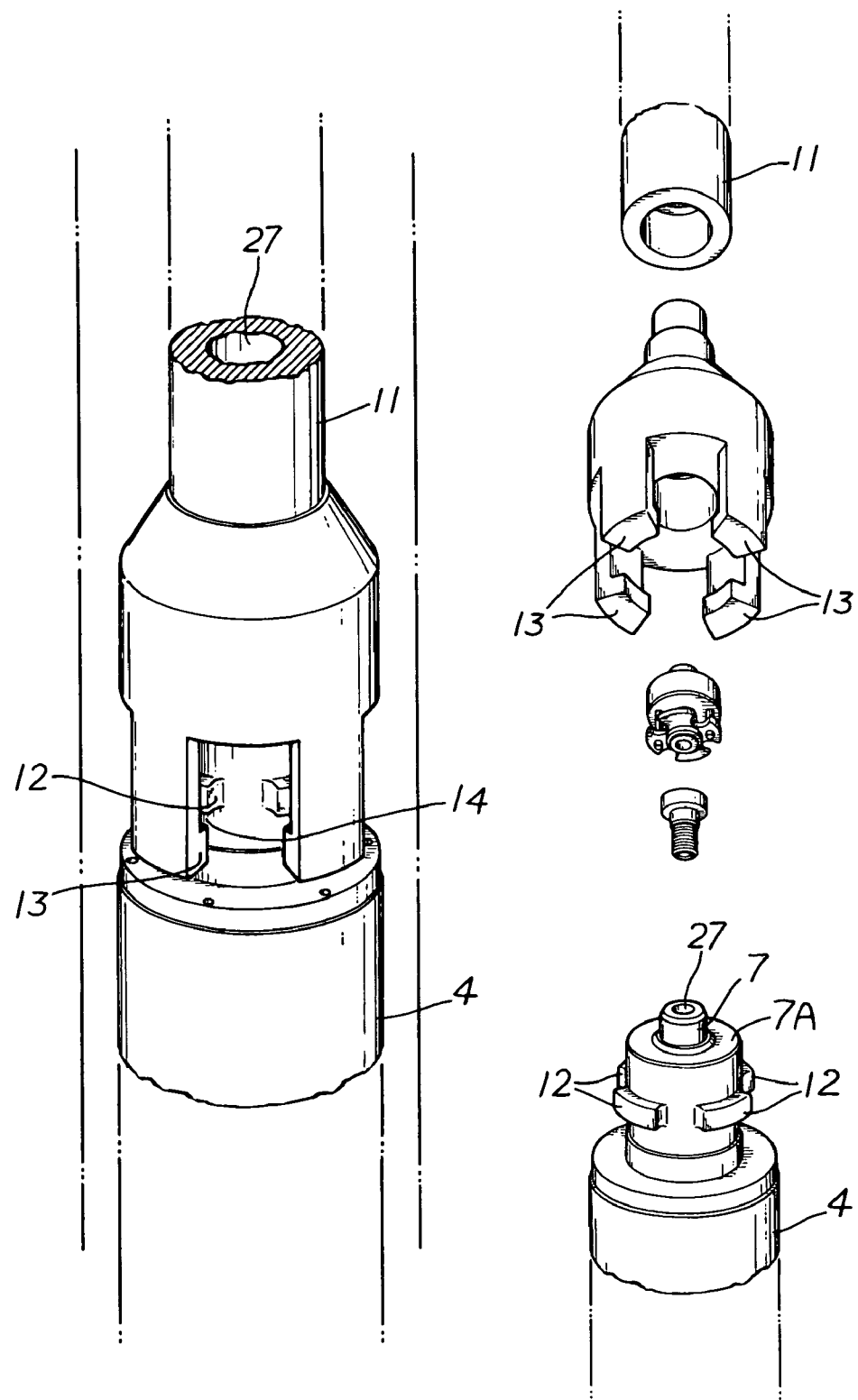
FIG. 11 is a descriptive perspective diagram of the reciprocating driver and drawbar of the turning center of the present example.
Figure 12:
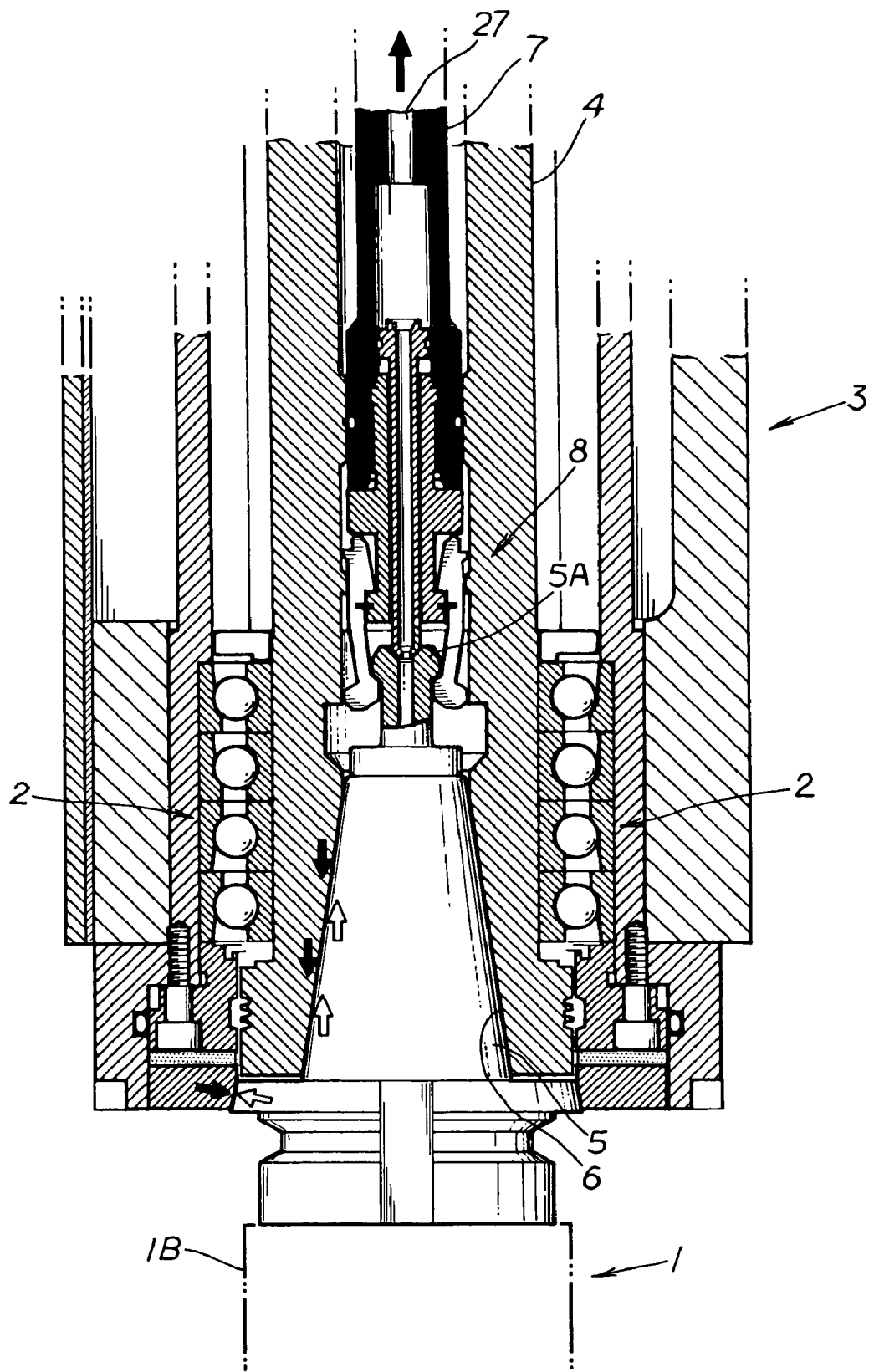
FIG. 12 is a descriptive cross-sectional diagram of the state in which the clamp mechanism of the turning center of the present example is actuated and clamped and the turning tool is mounted (second clamp position).
Figure 13:
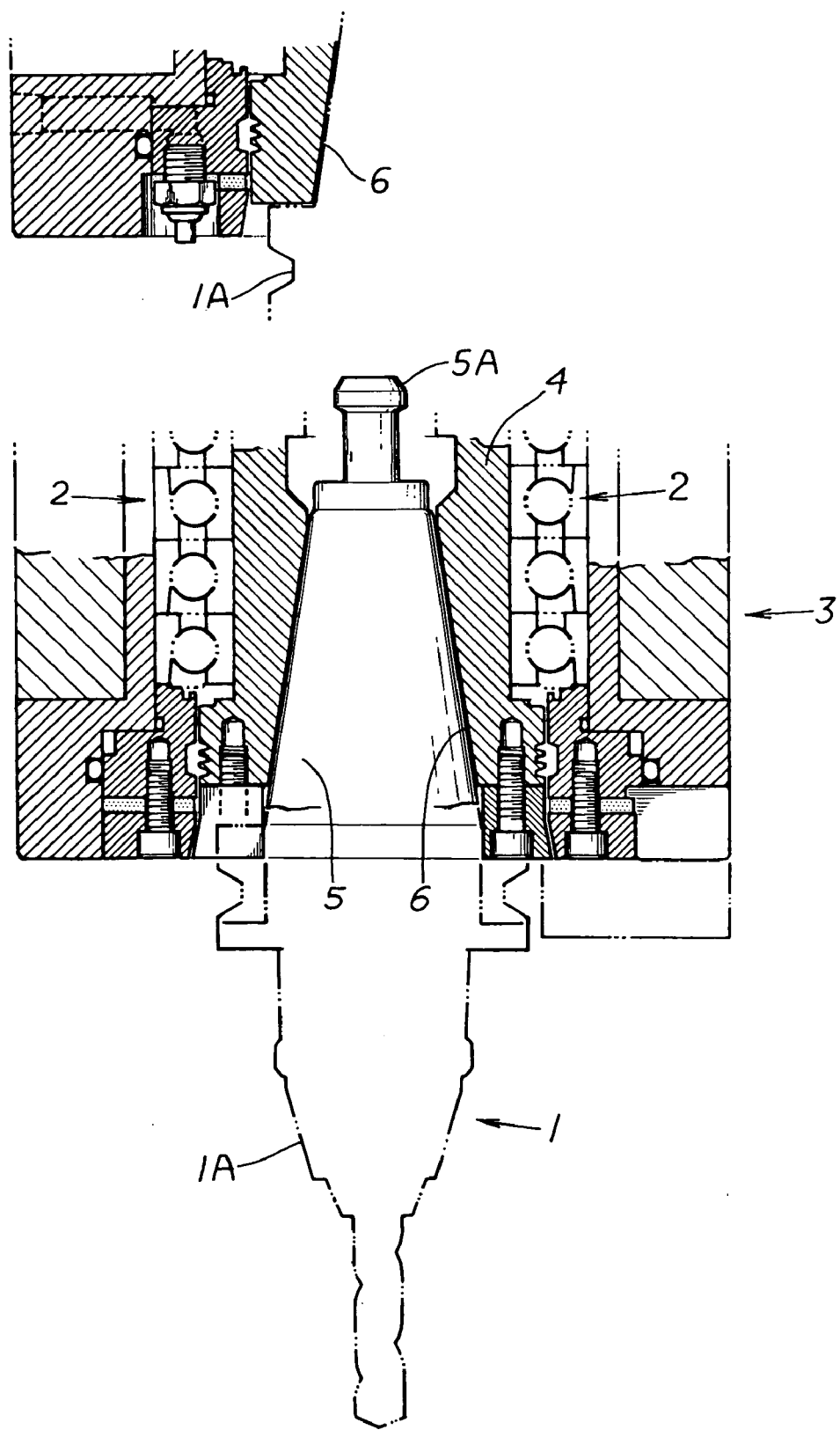
FIG. 13 is a descriptive cross-sectional diagram of the state in which the clamp mechanism of the turning center of the present example is actuated and clamped and the rotating tool is mounted (first clamp position).
Figure 14:
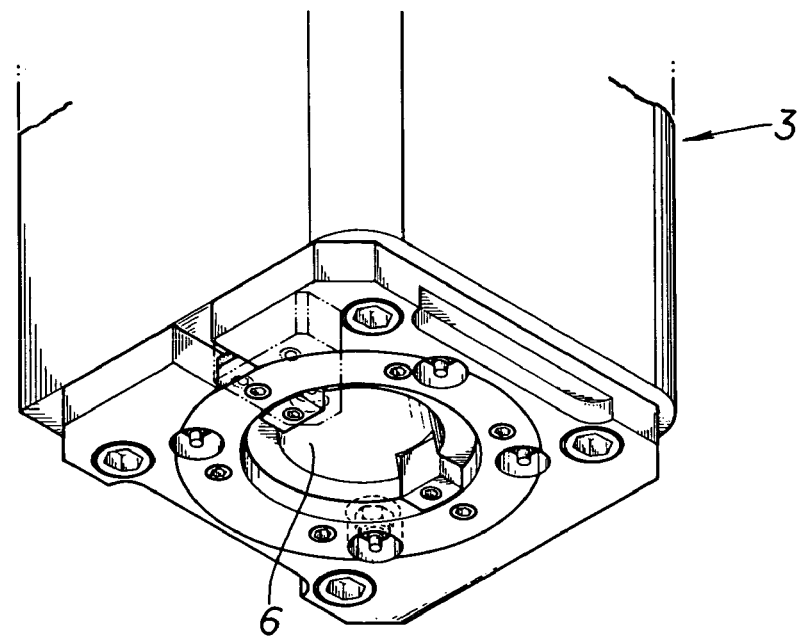
FIG. 14 is a descriptive perspective diagram of the tapered shank portion and the tool post of the turning center of the present example.
Figure 14:
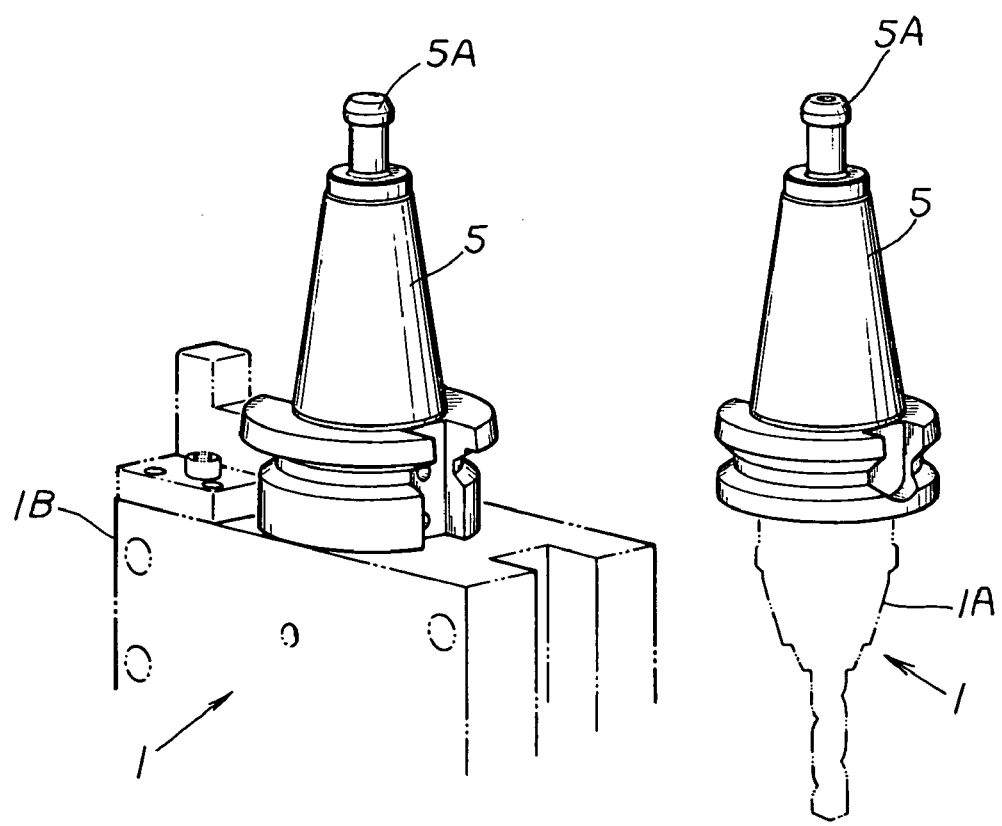

Embodiments (approaches for implementing the present invention) of the present invention thought to be advantageous are briefly described below on the basis of the diagrams to show the operation of the present invention.

When the clamp mechanism 8 begins the clamping operation and the drawbar 7 is retracted, the tapered shank 5 of the tool 1 is drawn to and engaged with the mounting engagement unit 6 provided to the main shaft 4, and the tool 1 is clamped/fixed.

By releasing the clamp mechanism 8, the drawbar 7 can be returned and the tool 1 detached by the pressing of the reciprocating driver 11.

Specifically, by bringing the air cylinder device 9 acting as the drawbar drive device 9 of the clamp mechanism 8 from the release position a to the first clamp position b, the rotating tool 1A is clamped/fixed. In this case, the drawbar 7 is retracted by the retracting force of the elastic member 10, and is returned from the release position by the reciprocating driver 11. In other words, the drawbar 7 is retracted by the elastic member 10 while the reciprocating driver 11 is pushed back, and the tapered shank 5 of the rotating tool 1A is drawn to the mounting engagement unit 6 and caused to reach the clamping position.

At this point, the drawbar 7 and reciprocating driver 11 remain in contact, and the stopper 12 provided to the drawbar driver 7A of the drawbar 7 and the support unit 13 provided to the reciprocating driver 11 are in a separated state.

The clamp is already fixed in this state. By setting the air cylinder device 9 in the first clamp position b, the reciprocating driver 11 is returned a little further and separated from the drawbar 7, and a rotation allowance gap 22 is maintained. By contrast, the support unit 13 provided to the reciprocating driver 11 approaches the stopper 12, and the rotation allowance gap 14 is maintained between the stopper 12 and the support unit 13.

Another feature of this structure is that an extended state is maintained and linkage is preserved for a rotary joint that rotatably links a center through pipe 27 which passes through the reciprocating driver 11 and a center through pipe 27 which passes through the the drawbar 7 and is designed to feed coolant or air.

Therefore, in the first clamp position b for clamping/fixing the rotating tool 1A, the drawbar 7 is retracted by the elastic member 10 to the clamping/fixing position, the stopper 12 and support unit 13 are separated, and the rotation allowance gap 14 is maintained. Also, for example, the reciprocating driver 11 and drawbar 7 are separated, rotating members and the cylinder device 9 or the reciprocating driver 11 driven thereby are reliably kept separated, and the main shaft 4 (and drawbar 7) which has clamped/fixed the rotating tool 1A can be rotated.

When a turning tool 1B is clamped/fixed, the configuration must withstand a considerable radial force, which is different than the case of the rotating tool 1A.

In view of the above, in the present invention, a wedge mechanism 18 is provided that can adequately counter a considerable radial load even if an air cylinder device with a low drive force is used instead of a large hydraulic device that can clamp and fix a shank with a large driving force. The wedge mechanism 18 is configured to engage and lock the clamp fixing position of the drawbar 7.

However, the lock mechanism does not operate if the clamp fixing position of the drawbar 7 has been simply engaged/locked. In other words, the configuration of a turning center is different than that of a simple lathe, and a rotating tool is also clamped, fixed, and rotated. Therefore, the tool must be rotatably configured with no connection between the drive mechanism of the clamp mechanism 8 and the drawbar 7 that rotates together with the main shaft 4. For this reason, the rotation allowance gap 14 between the stopper 12 and support unit 13 is maintained as described above in the first clamp position b for clamping/fixing the rotating tool 1A, and the rotation allowance gap 22 between the reciprocating driver 11 and drawbar 7 is also maintained. Therefore, even if engaging/locking takes place while the rotation allowance gap 14 and rotation allowance gap 22 are maintained, a locking effect cannot be obtained.

In view of the above, the turning tool 1B is brought not to the first clamp position b, but to the second clamp position c to which the reciprocating driver 11 has been further driven back, when the tool is clamped/fixed in accordance with the present invention. As a result, the reciprocating driver 11 is further retracted and the support unit 13 then makes contact with the stopper 12. The wedge 15 of the wedge mechanism 18 engages the wedge engagement unit 17 at the position of a return blocking state in which the stopper 12 supports/stops the support unit 13, and the return blocking state is engaged/locked.

Therefore, even if, for example, the drawbar driving device 9 for driving/controlling the reciprocating driver 11 constitutes the air cylinder device 9, the clamp fixing position of the drawbar 7, which has clamped/fixed the turning tool 1B, is engaged/locked in the position of the reciprocating driver 11 in a return blocking state in which the stopper 12 is supported by the support unit 13. This state is maintained even if the urging force of the elastic member 10 that retracts/urges the drawbar 7 is not sufficiently large to counter the considerable radial load generated when the turning tool 1B is in operation.

Therefore, the present invention is configured so that in a turning center configured with a shared clamp mechanism 8, a cylinder device 9 acting as a drawbar drive device 9 of the clamp mechanism 8 has a first clamp position b and a second clamp position c in relation to a release position a; a rotation allowance gap 14 is specifically maintained between the stopper 12 and the support unit 13 in the first clamp position b at which the rotating tool 1A is clamped/fixed; in the second clamp position c the reciprocating driver 11 is driven by an amount equal to the rotation allowance gap 14; and when the support unit 13 and the stopper 12 are brought into contact and a load is imposed, the stopper 12 is supported/stopped by the support unit 13, and the reciprocating driver 11 is engaged/locked by the wedge mechanism 18 in the position of the return blocking state in which the return of the drawbar 7 is blocked. Even though the configuration has a shared clamp mechanism 8, an innovative tool mounting device for a turning center can be designed by simply changing the cylinder position of the drive device whereby the locking effect of the wedge mechanism 8 is reliably demonstrated without interfering with the rotation of the rotating tool 1A, a considerable load during the processes of a turning tool 1B can be adequately countered even when a small drive source is used to enable an oilless structure in which, for example, an air cylinder device 9 is used, and clamping/fixing can be securely performed.

EXAMPLES

Detailed examples of the present invention are described below with reference to the diagrams.

A mounting engagement unit 6 for engaging a tapered shank 5 mounted on the base end of a tool 1 is provided to a main shaft 4 that is rotatably mounted on a ram 3 via a support unit 2. A clamp mechanism 8 is provided for clamping a clamping convexity 5A of the tapered shank 5 when a drawbar 7 is retracted, and drawing/engaging the tapered shank 5 to the mounting engagement unit 6 to mount/fix the tool 1 on the main shaft 4 so as to allow the shank to be clamped and released based on the reciprocating control of the drawbar 7. In the present example, clamping is actuated by a configuration in which an elastic member 10 is fitted to the drawbar 7 and is used as a compression-resisting elastic unit for pushing the drawbar 7 upward against the main shaft 4 during compression. The drawbar 7 is retracted using the retracting force of the elastic member 10. Clamping is released by a configuration in which the drawbar 7 is returned via a reciprocating driver 11 (pushrod) by a pushing/driving operation directed against the retracting force of the air cylinder device 9 as the drawbar driving device 9.

The drawbar 7 that rotates together with the main shaft 4 is rotatably mounted on the reciprocating driver 11 (pushrod) driven by the air cylinder device 9 and is caused to push/drive the drawbar 7. A stopper 12 is provided to a drawbar driver 7A that is pushed by the reciprocating driver 11 of the base end portion of the drawbar 7, and a support unit 13 for supporting the stopper 12 and blocking the drawbar 7 from returning from the retracted clamp position (clamp fix position) of the drawbar 7 is provided to the reciprocating driver 11. The stopper 12 is configured so as to make no contact with the support unit 13 and to maintain a rotation allowance gap 14 therebetween when the drawbar 7 is retracted by the retracting force of the elastic member 10 to clamp/fix a rotating tool 1A, and is configured so as to be brought to a return blocking state in which the reciprocating driver 11 is retracted by the air cylinder device 9 by an amount equal to the rotation allowance gap 14, and the stopper 12 can support the support unit 13 when a turning tool 1B is clamped/fixed.

A wedge mechanism 18 is provided in which a reciprocatingly movably disposed wedge 15 is moved/driven by a wedge driving device 16 (an air cylinder device 16 is adopted to obtain an oilless structure) to engage a wedge engagement unit 17 and to engage/lock the retracted clamp position of the drawbar 7 in a state in which the reciprocating driver 11 is retracted and brought to a return blocking state. The air cylinder device 9 has a release position a for pushing/driving the drawbar 7 against the retracting force of the elastic member 10 and releasing the clamp on the rotating tool 1A and turning tool 1B, a first clamp position b for clamping/fixing the rotating tool 1A by the retracting force of the elastic member 10, and a second clamp position c for clamping/fixing the turning tool 1B by moving the stopper 12 into a return blocking state that allows the support unit to be supported in a state in which this position is engaged/locked by the wedge mechanism 18.

More specifically, the clamp mechanism 8 and wedge mechanism 18 have a configuration in which the support unit 13 is provided to the lower end of the reciprocating driver 11 (pushrod) in a state facing the retracting direction side of the drawbar 7 of the stopper 12 which moves together with the reciprocating movement of the drawbar 7; the stopper 12 makes no contact with the support unit 13 and maintains the rotation allowance gap 14 in the first clamp position b for clamping/fixing the rotating tool 1A; the reciprocating driver 11 moves by an amount equal to the rotation allowance gap 14, the support unit 13 makes contact with the stopper 12, and the stopper 12 is brought to a return blocking state which allows the support unit 13 to be supported in the second clamp position c for clamping/fixing the turning tool 1B; and the wedge 15 is moved by the wedge driving device 16 in which an air cylinder device 9 is adopted for the wedge engagement unit 17 provided to the reciprocating driver 11, and the retracted position of the reciprocating driver 11 brought to an engaged return blocking state is engaged/locked.

Therefore, the driving of a rod 9A of the air cylinder device 9 drives the reciprocating driver 11 (pushrod) by way of a lever mechanism 20 to be described later, the drawbar driver 7A at the upper end of the drawbar 7 is pushed, and the drawbar 7 is returned. In other words, the air cylinder device 9 pushes the drawbar driver 7A by pushing/driving the reciprocating driver 11, and returns the drawbar 7 against the action of the elastic member 10. When a rotating tool 1A is clamped/fixed, the reciprocating driver 11 is pushed back by the drawbar driver 7A under the retracting force of the elastic member 10 brought about by the drive release or the driving of the air cylinder device 9 in the retracting direction while the drawbar 7 is retracted so that the drawbar 7 and the drawbar driver 7A are retracted to the clamp fixing position. The reciprocating driver 11 is then retracted further, the air cylinder device 9 is brought to the first clamp position b, and a rotation allowance gap 22 is thereby maintained between the drawbar driver 7A and the reciprocating driver 11 as well.

More specifically, a rotating tool 1A is clamped/fixed by bringing the air cylinder device 9, which serves as the drawbar driving device 9 of the clamp mechanism 8, from the release position a to the first clamp position b. In this case, the drawbar 7 is retracted by the retracting force of the elastic member 10 from the release position to which the tool has been returned by the reciprocating driver 11. In other words, the drawbar 7 pushes back the reciprocating driver 11 while being retracted by the elastic member 10, and the tapered shank 5 of the rotating tool 1A is retracted to the mounting engagement unit 6 and is brought at the clamp position for engagement.

At this time, the drawbar 7 and reciprocating driver 11 remain in contact, and the stopper 12 provided to the drawbar driver 7A of the drawbar 7, and the support unit 13 provided to the reciprocating driver 11 remain separated.

The clamp is already fixed in this state, but by setting the air cylinder device 9 to the first clamp position b, the reciprocating driver 11 is returned somewhat further and separated from the drawbar 7, and the rotation allowance gap 22 is maintained. The support unit 13 provided to the reciprocating driver 11 approaches the stopper 12, but a rotation allowance gap 14 is still maintained between the stopper 12 and the support unit 13 as well.

Therefore, in the first clamp position b for clamping/fixing the rotating tool 1A, the drawbar 7 is retracted by the elastic member 10 to the clamp fixing position, the stopper 12 and support unit 13 are separated, and the rotation allowance gap 14 is maintained. The reciprocating driver 11 and drawbar 7 are separated, a state is maintained in which the rotating member is reliably separated from the cylinder device 9 or the reciprocating driver 11 driven thereby, and the main shaft 4 (and drawbar 7) to which the rotating tool 1A is clamped/fixed makes no contact and is allowed to rotate.

The case of clamping/fixing the turning tool 1B is different from the case involving the rotating tool 1A in that a considerable radial load must be withstood.

In view of the above, a wedge mechanism 18 that is capable of adequately countering the radial load even with an air cylinder device having a low driving force is provided in the present example, and the use of a large hydraulic cylinder that can ensure clamping/fixing with considerable driving force is not required. The clamp fixing position of the drawbar 7 is engaged/locked by the wedge mechanism 18.

However, the lock mechanism does not operate if the clamp fixing position of the drawbar has been simply engaged/locked. In other words, the configuration of a turning center is different from that of a simple lathe, and a rotating tool is also clamped, fixed, and rotated. Therefore, the tool must be rotatably configured with no connection between the drive mechanism of the clamp mechanism 8 and the drawbar 7 that rotates together with the main shaft 4. For this reason, the rotation allowance gap 14 between the stopper 12 and support unit 13 is maintained as described above in the first clamp position b for clamping/fixing the rotating tool 1A, and the rotation allowance gap 22 between the reciprocating driver 11 and drawbar 7 is also maintained. Therefore, even if engaging/locking takes place while the rotation allowance gap 14 and rotation allowance gap 22 are maintained, a locking effect cannot be obtained.

In view of the above, when the turning tool 1B is clamped/fixed in the present example, the device is brought not to the first clamp position b, but to the second clamp position c to which the reciprocating driver 11 has been further driven back. As a result, the reciprocating driver 11 is further retracted and the support unit 13 then makes contact with the stopper 12. The wedge 15 of the wedge mechanism 18 engages the wedge engagement unit 17 at the position of a return blocking state in which the stopper 12 supports/stops the support unit 13, and the return blocking state is engaged/locked.

Therefore, even if the drawbar driving device 9 for driving/controlling the reciprocating driver 11 constitutes the air cylinder device 9, the clamp fixing position of the drawbar 7, at which the turning tool 1B is clamped/fixed, is engaged/locked in the position of the reciprocating driver 11 in a return blocking state in which the stopper 12 is supported by the support unit 13. This state is maintained even if the urging force of the elastic member 10 that retracts/urges the drawbar 7 is not adequately large to counter the considerable radial load generated when the turning tool 1B is in operation, thereby allowing a considerable radial load to be endured.

Specifically, the wedge mechanism 18 provided to the clamp mechanism 8 forms a tapered wedge surface 19 that is inclined in relation to the reciprocating direction of the wedge 15 on the pressing/engagement unit of the wedge 15 and the wedge engagement unit 17. In other words, the wedge engagement unit 17 fixes to the reciprocating driver 11 a forming member 17A that forms the wedge engagement unit and is reciprocatingly linked to the reciprocating driver 11 (pushrod). A concavity or hole into which the wedge 15 can be reciprocatingly inserted is formed by the forming member 17A and the support unit 17B of the reciprocating driver 11. The tapered surface 19 is formed on one of the inside surfaces of the engagement unit (concavity or hole), and the other surface is made to be a straight surface (in the present example, a tapered surface 19 is formed on the forming member 17A, and the end surface opposing the forming member 17A of the immobile support unit 17B is a straight surface), and one of the outside surfaces of the wedge 15 is made to be a straight surface so as to reciprocatingly guide the aforementioned straight surface. A tapered surface 19 for contacting the tapered surface 19 is formed on the outside surface of the opposing side.

Therefore, the wedge 15 moves and the tapered surfaces 19 contact each other under pressure, whereby the wedge 15 is not merely inserted/fitted, but is wedged and locked.

When the wedge 15 moves and pushes/engages (wedges/stops) the wedge engagement unit 17, the retracted clamp position of the reciprocating driver 11 (second clamp position) is engaged/maintained, and the turning tool 1B is securely mounted/fixed to the ram 3. The shapes of the wedge engagement unit 17 and the wedge 15 are set so as to form a clamp/release space that allows the reciprocating driver 11 to move in the clamp release direction, which is the opposite direction from the clamping direction when the wedge is returned.

More specifically, a stepped portion 17C in which the opposing distance to the end surface of the support unit 17B is varied is provided to the forming member 17A that forms the wedge engagement unit, and a convexity 15A is formed on the wedge 15, whose distal end surface forms a pushing/engagement unit. When the wedge 15 is retracted and driven by the wedge driving device 16 in the direction orthogonal to the reciprocating direction of the reciprocating driver 11, the convexity 15A of the wedge 15 rides up on the stepped portion 17C, and the tapered surface 19 provided in the vicinity of the stepped portion 17C, and the tapered surface 19 provided to the distal end surface of the convexity 15A make contact with each other, and become wedged/locked. Conversely, when pushed/driven in the opposite direction by the wedge driving device 16, the tapered surfaces 19 are released, the convexity 15A of the wedge 15 drops from the stepped portion 17C, and a clearance is formed with respect the wedge 15 to permit the movement of the forming member 17A provided to the reciprocating driver 11. The wedge engagement unit 17 and wedge 15 are designed with a shape in which a clamping/releasing space is maintained in a state in which the convexity 15A is released and caused to fall from the stepped portion 17C to release the pushing/engaging action.

A lever mechanism 20 is provided to the clamp mechanism 8. In other words, the reciprocating driver 11 (pushrod) is driven using a reciprocating rod 9A of the air cylinder device 9 by way of the lever mechanism 20. More specifically, a force point 25 is provided to one end of a lever 24 that rotates about a fulcrum 23 pivotably fixed in a prescribed position, the reciprocating rod 9A of the air cylinder device 9 as a lever drive device is linked to the force point 25, an actuator 26 is provided the other end of the lever 24 in a position in which the distance from the fulcrum 23 is less than the distance between the force point 25 and the fulcrum 23, and the reciprocating driver 11 is reciprocated by the actuator. Also provided is a lever mechanism 20 capable of reciprocating and controlling the reciprocating driver 11 by increasing the reciprocating driving of the reciprocating rod 9A of the cylinder device 9.

To provide a description in further detail, the present example is configured so that when a force is applied to the force point 25 on one side of the lever 24 driven by the reciprocating rod 9A of the air cylinder device 9 that serves as the lever driving device (or by the urging of the elastic body produced by the release of the driving), a rotational force about the fulcrum 23 is generated in the actuator 26, an increased rotational force is generated on the actuator 26 by the difference in the distance to the fulcrum 23, and the increased force causes the reciprocating driver 11 to press down against the retraction force of the elastic member 10.

A pusher 26A for pushing/making contact with the retracting pushers 11A and 11B of the reciprocating driver 11 is provided to the actuator 26. In the present example, the retracting pushers 11A and 11B of the reciprocating driver 11 are provided so that their movement can be adjusted, whereby the pusher 26A presses/drives the reciprocating driver 11, and the retraction hold position of the reciprocating driver 11 is finely adjusted by the lever mechanism 20. In other words, the retracting pusher 11A provided to the reciprocating driver 11 is threadably engaged with a screw portion provided to the reciprocating driver 11, and the lower surface of the threadably mounted retracting pusher 11A and the upper surface of the retracting pusher 11B are pressed upward by the actuator 26 of the lever 24. The threadably adjusted position is fixed with the double nut method, and the retracted position of the reciprocating driver 11 can be finely adjusted.

A double nut structure allowing positional adjustment is similarly provided to a position facing the retracting pusher 11A.

The present example is further configured so that when a rotating tool 1A is clamped/fixed, a cylinder device 9 provided as the drawbar driving device 9 is driven from the first clamp position b and is temporarily brought to the second clamp position c, and is thereafter driven or released and brought to the first clamp position b, at which the rotation allowance gap 14 is maintained between the stopper 12 and the support unit 13 by the return force of the return elastic member 21. The supply/discharge of the driving medium of the cylinder 9 is cut off at the first clamp position b to allow the first clamp position b to be maintained.

In other words, in the present example, the force point side of the lever 24 is supported using the return elastic member 21, and a return force is generated when the cylinder device moves to the second clamp position c. In the absence of a load, the device is kept in the first clamp position b, in which the rotation allowance gap 14 or the like is constantly maintained. However, repeated use of the air cylinder device 9 is accompanied by a reduction in resistance, and the cylinder position varies when the return elastic member 21 weakens or otherwise loses force. When this happens, the first clamp position b, which is supposed to preserve the rotation allowance gap 14, tends to become unstable (rotation allowance gap 14 cannot be adequately assured). In view of the above, in the present example, the return elastic member 21 is provided to keep the device in the first clamp position b, but to reach the first clamp position b, the device is first temporarily brought to the second clamp position c and then to the first clamp position b. In this position, the air from the cylinder device 9 is shut off so that the position can be reliably maintained.

The present invention in not limited by the present working example and allows the specific configuration of the constituent features to be suitably designed.

What is claimed is:

1. A tool mounting device for a turning center in which:
rotating tools and turning tools are exchanged and used,
wherein a mounting engagement unit for engaging a tapered shank provided to the base end of a tool is disposed on a main shaft that is rotatably mounted on a ram via a support unit;
a clamp mechanism is disposed for clamping a clamping convexity of said tapered shank by the retracting of a drawbar and drawing in and engaging said tapered shank to the mounting engagement unit to mount/fix tools to said main shaft so as to allow the shank to be clamped and released based on the reciprocating control of said drawbar; and
the clamp mechanism is configured to actuate said clamping by retracting said drawbar with a retracting force produced by an elastic member, and to return said drawbar and release said clamping by pushing/driving against the retracting force of a drawbar driving device, comprising:
said drawbar that rotates together with said main shaft being rotatably mounted on a reciprocating driver which is driven by said drawbar driving device to push/drive said drawbar;
a stopper being provided to said drawbar or to a location that moves together with the drawbar;
a support unit for supporting said stopper and blocking the drawbar from returning from the retracted clamp position of said drawbar being provided to said reciprocating driver or to a location that moves together with the reciprocating driver;
said stopper being configured so as to make no contact with said support unit and to maintain a rotation allowance gap therebetween when at least said drawbar is retracted by the retracting force produced by said elastic member and said rotating tool is clamped/fixed, and so as to be brought to a return blocking state in which said reciprocating driver is retracted by said drawbar driving device by an amount equal to at least the rotation allowance gap and said stopper can be supported by said support unit when a turning tool is clamped/fixed;

a wedge mechanism being provided in which a reciprocatingly movably disposed wedge is moved/driven by a wedge driving device to engage a wedge engagement unit and to engage and lock the retracted clamp position of the drawbar in a state in which the reciprocating driver is retracted and brought to a return blocking state; and a cylinder device being provided as said drawbar driving device has a release position for pushing/driving said drawbar against the retracting force of said elastic member and releasing the clamp on said rotating tool or said turning tool, a first clamp position for clamping/fixing said rotating tool by the retracting force produced by said elastic member, and a second clamp position for moving said stopper into said return blocking state that allows said support unit to be supported and clamping/fixing said turning tool in a state in which the position is engaged/locked by said wedge mechanism.

2. The tool mounting device for a turning center according to claim 1, wherein said clamping mechanism and said wedge mechanism are configured so that said support unit is disposed facing the retracting direction side of the drawbar of said stopper that moves together with the reciprocating movement of said drawbar, so as to move together with the reciprocating movement of said reciprocating driver;

said stopper makes no contact with said support unit and said rotation allowance gap is maintained in said first clamp position for clamping/fixing said rotating tool; and said reciprocating driver moves by an mount equal to said rotation allowance gap, said support unit makes contact with said stopper, said stopper is set in said return blocking state that allows the stopper to be supported by said support unit, said wedge is moved by said wedge driving device to engage said wedge engagement unit disposed on said reciprocating driver, and the retracted position of said reciprocating driver in said return stop state is engaged in said second clamp position for clamping/fixing said turning tool.

3. The tool mounting device for a turning center according to claim 1 or 2, wherein a drawbar driver with which said reciprocating driver makes contact when said reciprocating driver returns said drawbar by pushing is provided to said drawbar, and said drawbar driver is pushed by the pushing/driving of said reciprocating driver using said drawbar driving device to return said drawbar against the action of said elastic member and release said clamp; and when said rotating tool is clamped/fixed, said reciprocating driver is pushed back by said drawbar driver under the urging of the retracting force of said elastic member while said drawbar is retracted, and the drawbar and drawbar driver are retracted to the clamp fixing position, after which said reciprocating driver is retracted further and said cylinder device serving as said drawbar driving device is set to said first clamp position, and a rotation allowance gap is thereby maintained between said drawbar driver and said reciprocating driver as well.

4. The tool mounting device for a turning center according to claim 1 or 2, wherein a force point is provided to an end portion of a rotating lever that rotates about a fulcrum pivotably fixed in a prescribed position;

a reciprocating rod of said cylinder device as a lever drive device is linked to the force point;

an actuator is provided the other end of said lever in a position in which the distance from the fulcrum is less than the distance between the force point and the fulcrum, and said reciprocating driver is reciprocated at the actuator; and a lever mechanism is provided capable of reciprocating and controlling said reciprocating driver by increasing the reciprocating driving of the reciprocating rod of said cylinder device.

5. The tool mounting device for a turning center according to claim 1 or 2, wherein when said rotating tool is clamped/fixed, a cylinder device provided as said drawbar driving device is temporarily set as said second clamp position, and is thereafter driven or released and set to said first clamp position in which said rotation allowance gap is maintained between said stopper and said support unit by the return force of the return elastic member of the cylinder device; and the supply/discharge of the driving medium of said cylinder is cut off at the first clamp position to allow the first clamp position to be maintained.

6. The tool mounting device for a turning center according to claim 1 or 2, wherein the cylinder device provided as said drawbar driving device is other than a hydraulic cylinder device and is an air cylinder device.

7. The tool mounting device for a turning center according to claim 4, wherein when said rotating tool is clamped/fixed, said cylinder device is temporarily brought to said second clamp position, and thereafter driven or released and set to said first clamp position in which said rotation allowance gap is maintained between said stopper and said support unit by the return force of the return elastic member of the cylinder device; and the supply/discharge of the driving medium of said cylinder is cut off at the first clamp position to allow the first clamp position to be maintained.

8. The tool mounting device for a turning center according to claim 4, wherein said cylinder device is other than a hydraulic cylinder device and is an air cylinder device.

9. The tool mounting device for a turning center according to claim 5, wherein said cylinder device is other than a hydraulic cylinder device and is an air cylinder device.

* * * * *

UNITED STATES PATENT AND TRADEMARK OFFICE
CERTIFICATE OF CORRECTION

| | | |
|---|---|---|
| PATENT NO. | : 7,220,089 B2 | Page 1 of 1 |
| APPLICATION NO. | : 11/337649 | |
| DATED | : May 22, 2007 | |
| INVENTOR(S) | : Takio Nakamura et al. | |

It is certified that error appears in the above-identified patent and that said Letters Patent is hereby corrected as shown below:

In column 5, line 20, "bearing unit" should be --support unit--

Signed and Sealed this

Twenty-third Day of October, 2007

JON W. DUDAS
*Director of the United States Patent and Trademark Office*